Inventors
JACQUES P. DRABIER
KERMIT D. KERRUISH
Linda Folkard Stengel
Rudolph F. Stengel.

By

Attorney

United States Patent Office 3,523,206
Patented Aug. 4, 1970

3,523,206
PLASMA CONTAINMENT MEANS
Jacques P. Drabier, Los Angeles, Calif., Kermit D. Kerruish, Phoenix, Ariz., and Linda Folkard Stengel, and Rudolph F. Stengel, Los Angeles, Calif., assignors to Entropy Limited, Toronto, Ontario, Canada, a corporation of Ontario
Filed Oct. 31, 1967, Ser. No. 679,311
Int. Cl. H01j 1/50
U.S. Cl. 313—161                                       8 Claims

ABSTRACT OF THE DISCLOSURE

A magnetic enclosure for the containment of a plasma comprising a torus having a plurality of star-shaped electromagnetic coil assemblies located in spaced adjacency around and along the circumference of the torus in which all of the coils in all of the assemblies are oriented with like poles of all coils facing radially inwardly toward the center of the torus whereby all poles of like polarity face each other with a torus space therebetween.

BACKGROUND OF THE INVENTION

This invention relates to an apparatus and method for generating, containing, and maintaining an ionized gas.

From theory, it is known that an ionized gas can be contained within a magnetic enclosure surrounded by electromagnetic coils which provide an electromagnetic field of appropriate configuration. In the above context, an "appropriate configuration" is one in which the curvature of the magnetic field lines in the vicinity of an electrically charged particle is everywhere concave with respect to said particle, and in which the strength of the magnetic field must, of consequence, increase in every direction away from said electrically charged particle. A field as herein described will be referred to as a "concave field" or as a field meeting the "concavity condition."

Thus far it has been held that it is not possible to devise an arrangement of electromagnetic coils around a toroidal containment spaec in such a way as to rigorously comply with the concavity condition ("Progress Toward Fusion Power," T. K. Fowler and R. F. Post, pp. 21–31, No. 6, Scientific American 215 (1966); "A.E.C. Policy and Action Paper on Controlled Thermonuclear Research," Report T.I.D–23277, in particular pp. 11–22, United States Atomic Energy Commisison, June 1966). In particular, it has been argued on topological grounds that, from the viewpoint of an electrically charged particle within a torus, an electromagnetic field line running in a general circumferential direction and on a radius larger than the radius locating the particle, must necessarily exhibit a convex (rather than concave) curvature with respect to the particle. Such generally circumferential field lines may be generated by coil windings which are arranged in such a manner that the coil is in the form of a solenoid connected end-to-end and enveloping the toroidal containment space. In view of this inherent difficulty, it has further been proposed to utilize a composite containment coil, such that the windings of the individual coil layers exhibit different pitch; this proposed configuration is also known as "high shear," with reference to the "shear" between electromagnetic field lines generated by different coil layers. It has been hoped that, in consequence of shear, an individual particle would, on the average, spend more time in regions of concave field curvature and less time in regions of convex field curvature, thereby attaining stable confinement by an averaging process.

It is an object of the present invention to provide means for stable containment and control of an ionized gas within a magnetic enclosure by providing a particularly advantageous arrangement of magnetic dipoles about that enclosure.

It is a further object of the present invention to provide a novel arrangement of electromagnetic coils capable of producing a concave field.

It is a further object of the present invention to overcome the above-mentioned difficulties by providing a novel arrangement of electromagnetic coils which can be utilized to provide stable containment and control of an ionized gas within a toroidal magnetic enclosure.

DESCRIPTION OF THE INVENTION

The present invention provides a magnetic enclosure for confining and maintaining an ionized gas characterized by a plurality of magetic dipole assemblies located in predetermined orientation about the enclosure, each of said magnetic dipole assemblies comprising at least three radially spaced magnetic dipoles having their respective dipole axes intersecting substantially centrally of a cross-section through said magnetic enclosure; at least said three magnetic dipoles in each respective magnetic dipole assembly having poles of like polarity facing inwardly toward the center of said cross-section.

While the present invention discloses a magnetic dipole configuration which is particularly advantageous for plasma containment in a hollow, endless tubular enclosure (e.g. torus), the advantages of said dipole configuration according to the invention are not limited to endless plasma configurations. As a specific but not exhaustive example, it has been proposed to confine plasma within a generally cylindrical space having a straight axis of symmetry. The strengths of the confining magnetic dipole means are then distributed such that, at the ends of said cylinder the confining magnetic dipole means are much stronger than in the central section of said cylinder. This arrangement is referred to as a "magnetic mirror." Thus far, the proposed electromagnetic means have consisted in every case of solenoidal coil windings. The novel dipole arrangement of this invention is equally applicable to a "magnetic mirror" or to any other topology relying on magnetic fields for plasma containment.

In accordance with the present invention, it is preferred that the magnetic dipoles comprise electromagnetic coils (or electromagnetic coil windings) energizable by electric current. However, under some circumstances, it may be preferable to employ only permanent magnets (e.g. Al Ni Co) or a combination of permanent magnets and electromagnetic coils as the magnetic dipoles in the present invention.

For a thorough understanding of the present invention and its many advantages, reference is made to the following detailed description of one illustrative embodiment taken in conjunction with the accompanying drawings in which.

Figure 1:
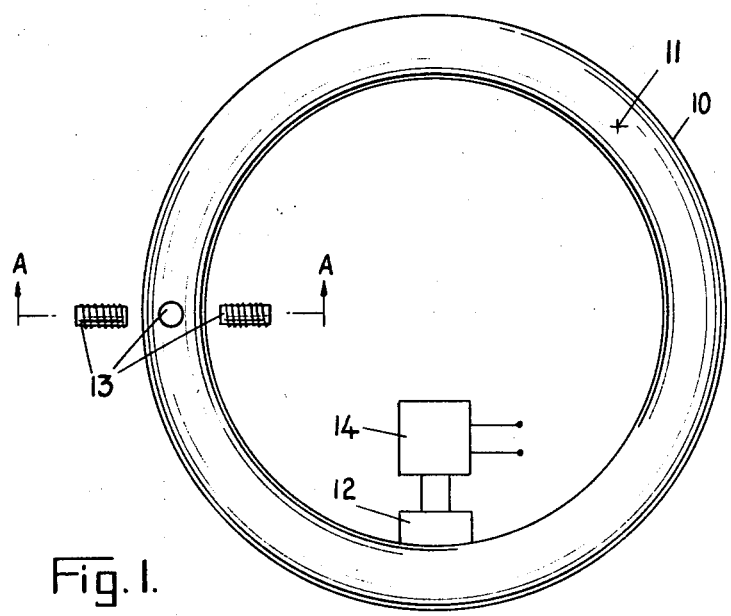
FIG. 1 shows a schematic top view of one embodiment of the present invention.
Figure 2:
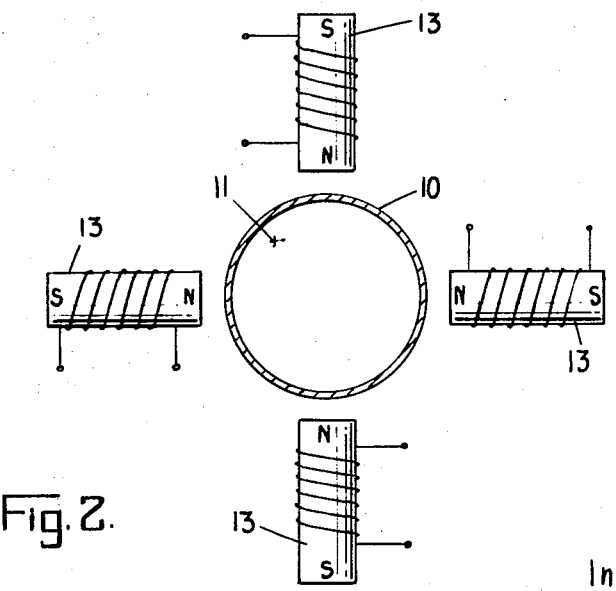
FIG. 2 shows a schematic cross-section along the line A—A through the structure shown in FIG. 1.

FIG. 1 shows a magnetic enclosure in the form of a toroidal structure 10 enclosing a containment space 11 and including ionizing means 12. Space 11 is preferably highly evacuated and contains a gas at low density. Ionizing means 12 are optional; they may consist for example of a pair of electrodes, or any other means of transferring energy to the gas within the containment space 11 as is disclosed in the prior art. Each magnetic dipole assembly comprises coils 13 which are arranged in a "star-shape" around the torus 10, as illustrated in FIGS. 1 and 2. A minimum of three magnetic coils are angularly spaced around any transverse cross-section of the torus to form one "star"; however, any practical number of such coils, in excess of three, may be employed.

It is preferred that the angles formed between the axes of any two adjacent coils be substantially equal. It is also preferable that the axes of all coils in each star be arranged to intersect at a common point located at or near the center of a transverse cross-section through the toroidal space 11. It will be apparent to those skilled in the art that variations from these preferred symmetries are permissible insofar as a sufficiently strong concave magnetic field is maintained about any cross-section of the torus to permit effective containment of the charged particles of the ionized gas.

Figure 3:
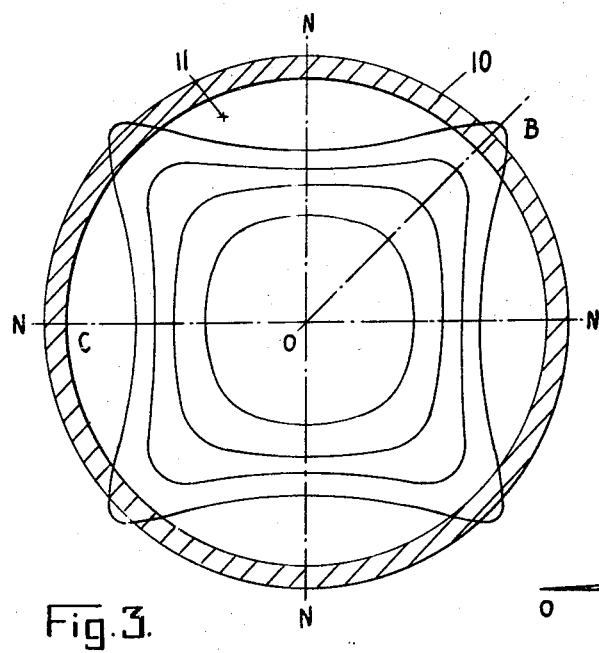
FIG. 3 shows a plot of lines of constant magnetic field strength for the cross-section shown in FIG. 2.

Although for reasons of clarity, only one such star is shown in FIG. 1, it should be understood that the invention provides for a plurality of such stars selectively spaced around the circumference of the torus 10. It is preferred that such stars be spaced equidistantly and uniformly around the circumference of the torus 10. (In the context of this application "selectively spaced around the circumference" should be understood to mean that each star is spaced at selected distances from the adjacent stars as measured along the centerline of the annular space 11 enclosed by the torus 10.) It is further preferred to have the circumferential spacing of the stars approximately equal to the spacing between the inward-facing poles of the coils of any given star. All coils 13 which comprise the coil stars (or magnetic dipole assemblies) are provided with coil windings in such a manner that all inward-facing poles are of like polarity (for example, are N (north) poles) and that correspondingly all outward-facing poles are also of like polarity (for example, are S (south) poles), as schematically indicated in FIGS. 2 and 3. To make it quite clear, it is mentioned that all of the magnetic coil assemblies are oriented with like poles of all coils facing radially inwardly toward the center of the torus whereby all poles of like polarity face each other with the torus space 11 therebetween.

Figure 4:
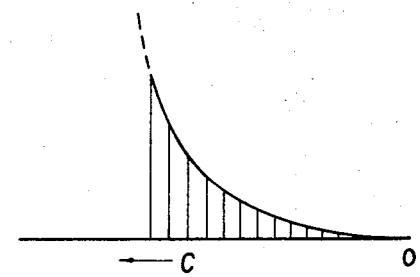
FIG. 4 shows a plot of magnetic field strength versus radial distance from the center O of the cross-section outward toward the point C.
Figure 5:
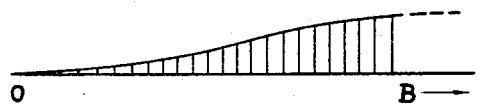
FIG. 5 shows a plot of magnetic field strength versus radial distance from the center O of the cross-section outward toward the point B.

FIG. 3 shows, for the specific case of four coils per star, the resulting lines of constant magnetic field strength in the center area of a cross-section through the torus space 11. It is evident that, for a particle in this center area, the magnetic field strength increases in all directions away from the center of the torus space 11, and decreases in all directions leading toward said center, as shown in FIGS. 4 and 5. This magnetic field acts to force any escaping ion of the ionized gas back toward the center of the cross-section, where the magnetic field is a minimum. Furthermore, it can be readily seen that, given a succession of coil stars 13 arranged closely and preferably uniformly (i.e. equidistantly) along the cirmcumference of torus 10, the resulting magnetic field in circumferential direction is again everywhere concave with respect to the center of the toroidal space 11. The magnetic field resulting from the coil arrangement as proposed by the present invention therefore complies inherently with the "concavity condition," and is therefore particularly conducive to effective containment of an ionized gas.

Referring now to the novel apparatus schematically shown in FIG. 1, one preferred manner of containing an ionized gas is described. Without impairing the generality of the operating concept according to the present invention, toroidal member 10 may for demonstration purposes consist of an ordinary neon tube bent into the shape of a complete circle, and having electrodes as ionizing means 12. Upon application of a sufficiently high voltage across the electrodes, the gas within space 11 is ionized and begins to emit visible light. Direct current is then admitted to the coil stars 13, thus generating an electromagnetic field as schematically shown in FIGS. 3 to 5, and tending to compress the region of ionized light-emitting gas radially inward toward the center of any cross-section of the torus. In this basic operating mode, it is necessary to continue the power supply to the ionizing electrodes 12 in order to maintain the plasma, since the electromagnetic field generated by the coil stars 13 is constant with respect to time and is therefore incapable of maintaining the gas in an ionized state.

In a modified preferred operating manner, an alternating current component is superimposed on the direct-current supply to the coil stars 13. The consequence is a cyclic "pinch" effect: as the coils are cyclically energized to a greater or lesser degree, depending on the amplitude and phase of the alternating current component, the corresponding lines of constant electromagnetic field strength, as shown in FIG. 3, are displaced radially inward or outward with respect to the center of any cross-section through the space 11. In this process, energy is transferred from the electromagnetic field to the electrically charged particles (ions) of the ionized gas. Depending on the relative relationship between the rate of energy input to the gas, and the rate of energy loss from the gas due to radiation and due to diffusion to the wall of torus 10, the cyclic "pinch" effect can be sufficient to increase the effective average temperature of the contained ionized gas to the level necessary for maintaining the gas in an ionized state. In the limiting case, the cyclic "pinch" effect can be sufficient to maintain this temperature at a preselected constant level.

Figure 6:
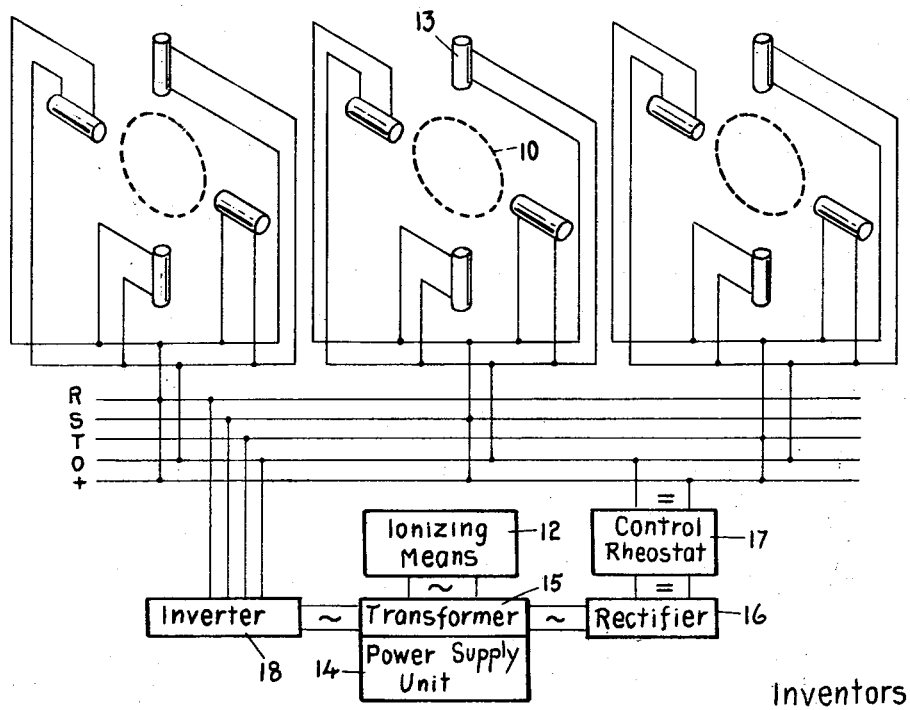
FIG. 6 shows a schematic electrical wiring diagram for the structure shown in FIG. 1.

In a further modification of the preferred operating manner, the alternating current supply to the coil stars 13 is a three-phase current. It will be apparent that the total number of coil stars 13 around the torus 10 should then be divisible by 3. Furthermore, successive stars are cyclically and sequentially connected to successive phases via separate wires of a three-phase alternating current supply system, as schematically indicated for three such successive coil stars in FIG. 6. Toward this purpose, as shown in FIG. 6, the basic power supply unit 14 may preferably be followed by a transformer 15, which in turn supplies a rectifier 16 and an inverter 18. Rectifier 16, with an interposed control rheostat 17, operable to control the supply of direct current to the coil stars 13, provides the direct current portion of the power supply to the coil stars 13. The inverter 18 is operable to provide the three-phase alternating current portion of the power supply to coil stars 13. The inverter 18 may further include means for controlling the amplitude and the frequency of the three-phase current.

The effect of this further modification of the preferred operating manner on the ionized gas within space 11 is to generate an overall magnetic field which, in addition to its constant component, has for $n$ coil stars 13 a total of $n/3$ "pinch" zones circulating around the torus at a velocity which is proportional to the frequency of the superimposed alternating three-phase current component. A "pinch" zone not only tends to displace charged particles radially inward toward the center of any cross-section of the torus, but also, if limited in circumferential extent, the "pinch" zone also tends to displace charged particles circumferentially toward regions of lesser instantaneous magnetic field strength. Since the "pinch" zones themselves circulate circumferentially around the torus, they thereby impart to the ionized gas not only the energy due to the "magnetic compression" or "pinch," but also a corresponding average circulating motion (and corresponding energy) around the torus. An arrangement according to FIG. 6 therefore tends to generate, in the ionized gas, zones of comparatively higher number of charged particles in a given cross-sectional slice, alternating with zones of comparatively lower numbers of particles. If the torus is composed of an ordinary neon tube and the coil stars do not completely cover the outside surface of the torus 10, the light pattern and intensity emitted by the ionized gas in the neon tube should exhibit a corresponding circulating effect.

Without restricting the invention in any way, it should be understood that when other working plasmas, having temperatures measured in terms of millions of dgerees centigrade, are enclosed by the novel magnetic enclosure, it may be desirable to ensure that the material of the walls of torus 10 is carefully selected. It is preferable that these walls consist of any material combining a low thermal conductivity and high melting point with good magnetic permeability.

It is recognized that such an undulating and circumferentially travelling magnetic containment field, as well as a corresponding set of alternating zones of relatively greater and lesser density of charged particles, has been disclosed in U.S. patent application Ser. No. 635,585, filed on May 2, 1967 by Wesley H. Bateman. However, the Bateman reference neither discloses, nor contemplates, the novel coil arrangement of this invention, which, by complying with the "concavity condition," ensures effective containment and maintenance of the charged particles (ions) of an ionized gas, or plasma.

While the novel magnetic enclosure of the present invention has been described with particular reference to a toroidal configuration, it is to be understood that other configurations for the enclosure fall within the scope of the invention.

What we claim as new and desire to protect by Letters Patent of the United States is:

1. A magnetic enclosure for confining and maintaining an ionized gas characterized by a plurality of magnetic dipole assemblies located in predetermined orientation along and about the enclosure, each of said magnetic dipole assemblies comprising at least three radially spaced magnetic dipoles having their respective dipole axes intersecting substantially centrally of a cross-section through said magnetic enclosure; the magnetic dipoles of all magnetic dipole assemblies have all poles of like polarity facing inwardly toward the center of said cross-section.

2. A magnetic enclosure according to claim 1, said magnetic enclosure being in the shape of a hollow endless tubular member.

3. A magnetic enclosure according to claim 1, at least some of said magnetic dipoles being electromagnetic coils.

4. A magnetic enclosure according to claim 3, said magnetic enclosure being toroidal in shape.

5. A magnetic enclosure according to claim 4, said magnetic dipole assemblies being selectively spaced along the circumference of the toroidal-shaped magnetic enclosure.

6. A magnetic enclosure according to claim 4, said magnetic dipole assemblies being spaced uniformly along the circumference of the toroidal-shaped magnetic enclosure.

7. A magnetic enclosure according to claim 4, wherein the coils of each magnetic coil assembly are equally radially spaced about a cross-section through the toroidal enclosure.

8. A magnetic enclosure according to claim 7, wherein the circumferential spacing between the magnetic coil assemblies is substantially equal to the spacing between juxtaposed inward-facing poles of the coils of each magnetic coil assembly.

References Cited

UNITED STATES PATENTS

| | | | |
|---|---|---|---|
| 2,910,414 | 10/1959 | Spitzer | 176—1 |
| 3,093,569 | 6/1963 | Post | 176—7 X |
| 3,143,477 | 8/1964 | Dolique | 313—161 X |

RAYMOND F. HOSSFELD, Primary Examiner

U.S. Cl. X.R.

176—3; 313—154